US011107122B2

(12) United States Patent
Roberts et al.

(10) Patent No.: US 11,107,122 B2
(45) Date of Patent: Aug. 31, 2021

(54) TARGETED ADVERTISEMENT CONTENT PRESENTATION METHODS AND SYSTEMS

(75) Inventors: Brian F. Roberts, Dallas, TX (US);
Anthony M. Lemus, Irving, TX (US);
Japan A. Mehta, Coppell, TX (US);
Kishore Tallapaneni, Flower Mound, TX (US); Donald H. Relyea, Dallas, TX (US); Michael R. Oliver, Hoboken, NJ (US)

(73) Assignee: Verizon and Patent Licensing Inc., Basking Ridge, NJ (US)

( * ) Notice: Subject to any disclaimer, the term of this patent is extended or adjusted under 35 U.S.C. 154(b) by 2139 days.

(21) Appl. No.: 13/195,820

(22) Filed: Aug. 1, 2011

(65) Prior Publication Data

US 2013/0036011 A1 Feb. 7, 2013

(51) Int. Cl.
*G06Q 30/02* (2012.01)
*H04N 21/2668* (2011.01)
*H04N 21/81* (2011.01)
*H04N 21/41* (2011.01)
*H04N 21/658* (2011.01)
(Continued)

(52) U.S. Cl.
CPC ... *G06Q 30/0251* (2013.01); *H04N 21/23418* (2013.01); *H04N 21/251* (2013.01); *H04N 21/25875* (2013.01); *H04N 21/2668* (2013.01); *H04N 21/4126* (2013.01); *H04N 21/4223* (2013.01); *H04N 21/42203* (2013.01); *H04N 21/44218* (2013.01); *H04N 21/44222* (2013.01); *H04N 21/44227* (2013.01); *H04N 21/4788* (2013.01); *H04N 21/6582* (2013.01); *H04N 21/812* (2013.01)

(58) Field of Classification Search
USPC .......................................... 704/14
See application file for complete search history.

(56) References Cited

U.S. PATENT DOCUMENTS 7,096,484 B2 * 8/2006 Mao .................. H04N 21/4782
725/52
7,515,136 B1 * 4/2009 Kanevsky .......... G06Q 30/0267
345/156
(Continued)

OTHER PUBLICATIONS

"Universal Plug and Play", archived on Feb. 26, 2010 at http://web.archive.org/web/20100226213540/http://en.wikipedia.org/wiki/Universal_Plug_and_Play.*
(Continued)

*Primary Examiner* — Michael Bekerman
*Assistant Examiner* — Scott Snider

(57) ABSTRACT

An exemplary method includes a media content presentation system detecting a presentation of a media content instance by way of a primary media content access device, determining that a secondary media content access device is located within a detection zone associated with the primary media content access device during a time period associated with the presentation of the media content instance, selecting, in accordance with a course correction heuristic, advertisement content related to the media content instance and configured to target a user of the secondary media content access device, and presenting the advertisement content to the user by way of the secondary media content access device during the presentation of the media content instance by the primary media content access device. Corresponding methods and systems are also disclosed.

15 Claims, 8 Drawing Sheets

(51) Int. Cl.

| | |
|---|---|
| *H04N 21/4788* | (2011.01) |
| *H04N 21/4223* | (2011.01) |
| *H04N 21/442* | (2011.01) |
| *H04N 21/234* | (2011.01) |
| *H04N 21/25* | (2011.01) |
| *H04N 21/258* | (2011.01) |
| *H04N 21/422* | (2011.01) |

(56) References Cited

U.S. PATENT DOCUMENTS

| | | | | |
|---|---|---|---|---|
| 7,751,805 | B2* | 7/2010 | Neven et al. | 455/414.3 |
| 8,316,020 | B1* | 11/2012 | Kleinmann | 707/734 |
| 8,665,333 | B1* | 3/2014 | Sharma et al. | 348/159 |
| 2004/0031058 | A1* | 2/2004 | Reisman | 725/112 |
| 2005/0198661 | A1* | 9/2005 | Collins | G09F 27/00 725/19 |
| 2009/0157472 | A1* | 6/2009 | Burazin et al. | 705/10 |
| 2010/0023965 | A1* | 1/2010 | Malik | H04N 21/435 725/32 |
| 2010/0042471 | A1* | 2/2010 | Chang et al. | 705/10 |

OTHER PUBLICATIONS

Uribe, S. et al. (2011) 'Visual Targeted Advertisement System Based on User Profiling and Content Consumption for Mobile Broadcasting Television', Mobile Networks & Applications, 16(3), pp. 361-374. doi: 10.1007/s11036-010-0258-2. (Year: 2011).*

M. Ma, D. Wilkes-Gibbs and A. Kaplan, "IDTV broadcast applications for a handheld device," 2004 IEEE International Conference on Communications (IEEE Cat. No. 04CH37577), Paris, France, 2004, pp. 85-89 vol. 1, doi: 10.1109/ICC.2004.1312457. (Year: 2004).*

Mekuria, R.N., 2011. Inter-destination media synchronization for TV broadcasts. (Year: 2011).*

Jong Woo Kim and Stephen Du, "Design for an Interactive Television Advertising System," Proceedings of the 39th Annual Hawaii International Conference on System Sciences (HICSS'06), Kauia, HI, USA, 2006, pp. 47-47, doi: 10.1109/HICSS.2006.116. (Year: 2006).*

* cited by examiner

TARGETED ADVERTISEMENT CONTENT PRESENTATION METHODS AND SYSTEMS

BACKGROUND INFORMATION

The advent of set-top box devices and other media content access devices ("access devices") has provided users with access to a large number and variety of media content choices. For example, a user may choose to experience a variety of broadcast television programs, pay-per-view services, video-on-demand programming, Internet services, and audio programming via a set-top box device. Such access devices have also provided service providers (e.g., television service providers) with an ability to present advertising to users. For example, designated advertisement channels may be used to deliver various advertisements to an access device for presentation to one or more users. In some examples, an advertisement may target (i.e., be configured to appeal to) a specific user of an access device.

However, in situations where a group of users experience (e.g., watch) a particular media content instance (e.g., a television program) together in the same room, for example, traditional targeted advertising is less effective. This is because each user's unique set of traits and interests may make it difficult or impossible to select an advertisement that appeals to each user in the group.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
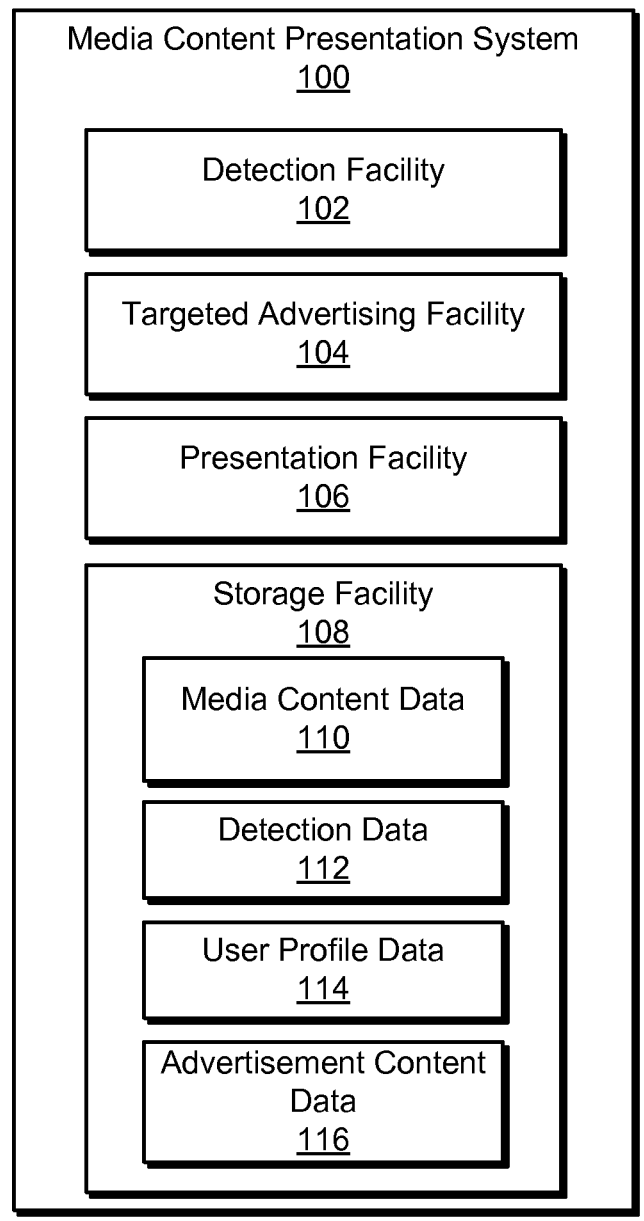
FIG. 1 illustrates an exemplary media content presentation system according to principles described herein.

Targeted advertisement content presentation methods and systems are described herein. As will be described below, the methods and systems described herein may facilitate concurrent presentation of different instances of targeted advertisement content to different users that are together watching or otherwise experiencing a media content instance by way of a primary access device (e.g., a set-top box device connected to a television). Each advertisement content instance may be related to the media content instance in some way (e.g., each advertisement content instance may be a unique version of a particular advertisement) and may be presented by way of a secondary access device (e.g., a mobile phone or a tablet computer) associated with each user. Because the advertisement content is personalized for each individual user, the users may each be more apt to pay attention to, interact with, and/or otherwise access the advertisement content.

An exemplary implementation of the methods and systems described herein includes a media content presentation system that detects a presentation of a media content instance by way of a primary access device (e.g., a set-top box device) and determines that one or more secondary access devices (e.g., mobile devices) are located within a detection zone associated with the primary access device (e.g., within the same room as the primary access device) during a time period associated with (e.g., immediately prior to or during) the presentation of the media content instance. The media content presentation system may then select one or more advertisement content instances related to the media content instance and configured to target the one or more users and present the one or more advertisement content instances to the one or more users by way of the one or more secondary access devices during the presentation of the media content instance by the primary access device.

To illustrate, a family comprising a father, a mother, and a child may be watching a particular television program being presented by way of a set-top box device when an advertisement for a particular type of car is presented during an advertisement break associated with the television program. The media content presentation system may detect that each member of the family is holding, interacting with, or otherwise near his or her own mobile device (e.g., a mobile phone or a tablet computer) immediately prior to or during the presentation of the advertisement and select a distinct version of the advertisement to be presented to each person by way of his or her mobile device. For example, the media content presentation system may present an interactive advertisement promoting the engine and/or speed of the car to the father, an interactive advertisement promoting the comfortable interior of the car to the mother, and an interactive advertisement promoting the DVD entertainment system included in the car to the child. In this manner, each member of the family may be concurrently presented with personalized advertisement content related to the advertisement while the advertisement is presented by way of the set-top box device.

In some examples, the media content presentation system may be configured to select the advertisement content that is to be presented to a user in accordance with a course correction heuristic. As used herein, a "course correction heuristic" refers to any heuristic or technique that refines, adjusts, or otherwise improves the manner in which advertisement content is selected for a particular user over the course of time. For example, the media content presentation system may analyze a manner in which a user interacts with various advertisement content instances that are presented to the user over the course of time. Based on the interaction, the media content presentation system may "learn" one or more tendencies and/or interests of the user. This acquired information may be used by the media content presentation system to subsequently select advertisement content that is relatively more likely to be of interest to the user.

As used herein, the term "media content instance" refers to any advertisement, television program, on-demand media program, pay-per-view media program, broadcast media program (e.g., broadcast television program), multicast media program (e.g., multicast television program), narrowcast media program (e.g., narrowcast video-on-demand program), IPTV media content, video, movie, audio content, or any segment, component, or combination of these or other forms of media content that may be processed by an access device for experiencing by a user. For illustrative purposes, the media content instance in many of the examples provided herein is an advertisement.

The term "advertisement content" refers to any type of advertisement content that may be associated with (e.g., related to) a media content instance presented by way of a primary media content access device. For example, advertisement content may include, but is not limited to, a text-based advertisement (i.e., an advertisement that primarily includes text), an image-based advertisement (i.e., an advertisement that includes one or more images), a coupon, a selectable link, an interactive advertisement, a different version of an advertisement being presented by the primary access device, and/or any other type of content as may serve a particular implementation. Specific instances of advertisement content will be referred to herein as "advertisement content instances."

FIG. 1 illustrates an exemplary media content presentation system 100 (or simply "system 100"). As shown, system 100 may include, without limitation, a detection facility 102, a targeted advertising facility 104 (or simply "advertising facility 104"), a presentation facility 106, and a storage facility 108 selectively and communicatively coupled to one another. It will be recognized that although facilities 102-108 are shown to be separate facilities in FIG. 1, any of facilities 102-108 may be combined into fewer facilities, such as into a single facility, or divided into more facilities as may serve a particular implementation.

Detection facility 102 may be configured to detect a presentation of a media content instance by way of a primary access device (e.g., a set-top box device). The presentation of the media content instance may be detected in any suitable manner. For example, detection facility 102 may detect that the primary access device is tuned to a channel carrying the media content instance during a particular time period associated with a transmission (e.g., broadcast) of the media content instance. Additionally or alternatively, detection facility 102 may detect that a media content instance is being presented by way of a primary access device by analyzing one or more media content streams being transmitted to the primary access device. For example, detection facility 102 may detect a presence of an advertisement break included in a media content stream being transmitted to the primary access device and thereby determine that an advertisement is being (or about to be) presented by way of the primary access device. Detection facility 102 may then analyze data included in the media content stream and/or in a corresponding advertisement stream to determine the contents of the advertisement.

Detection facility 102 may be further configured to determine that one or more secondary access devices are located within a detection zone associated with the primary access device during a time period associated with the presentation of the media content instance by way of the primary access device. As used herein, a "time period" associated with a presentation of a media content instance by way of a primary access device may include a time period immediately prior to the presentation of the media content instance or a time period during the presentation of the media content access device. For example, detection facility 102 may determine that a secondary access device is located with a detection zone associated with the primary access device immediately prior to and/or during a presentation of a particular advertisement by way of the primary access device. In this manner, system 100 may select and present targeted advertisement content related to the advertisement by way of the secondary access device during (e.g., concurrently with) the presentation of the advertisement.

Figure 2:
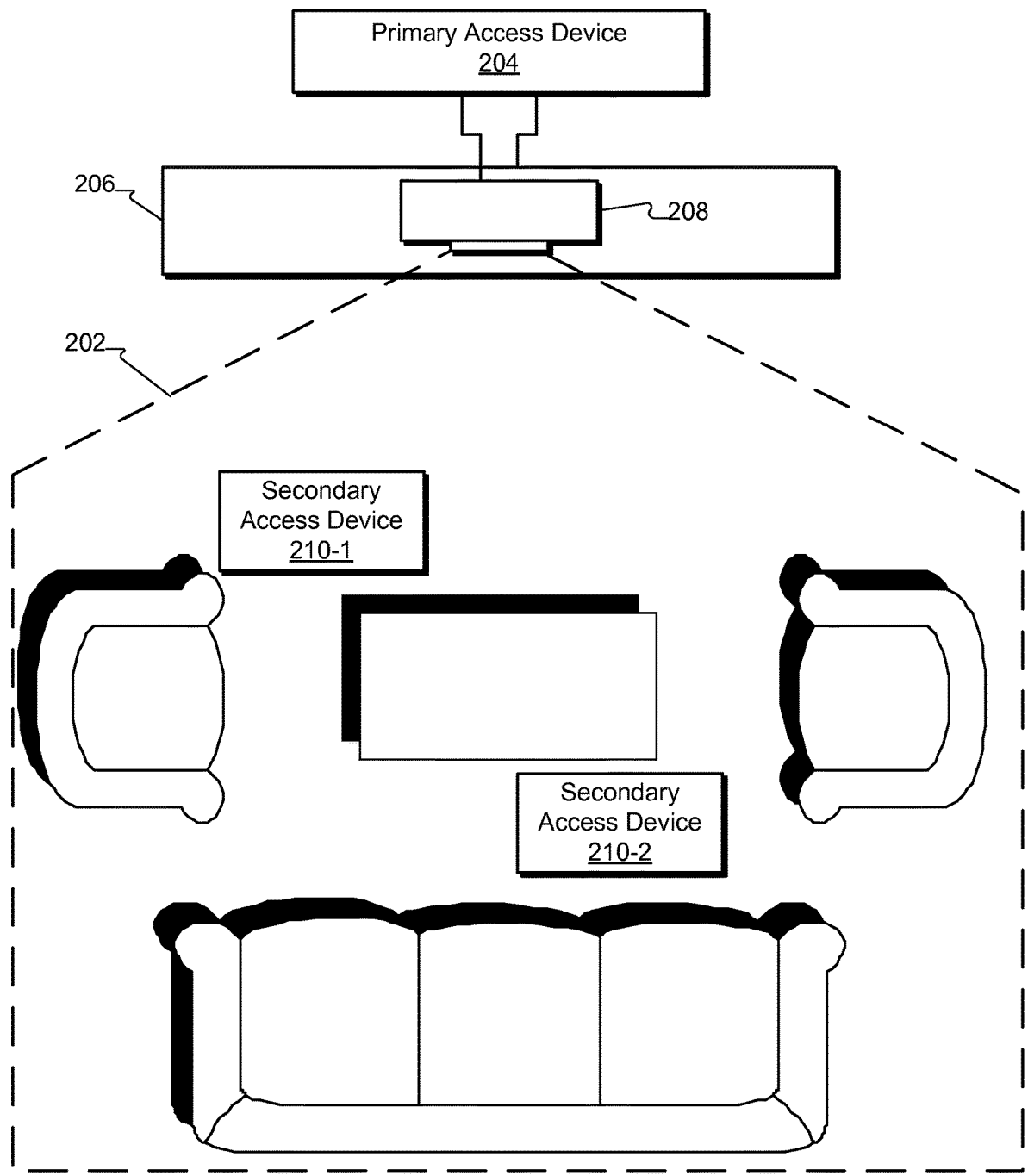
FIG. 2 illustrates an exemplary detection zone associated with a primary access device according to principles described herein.

Detection facility 102 may determine that a particular secondary access device is located within a detection zone associated with the primary access device in any suitable manner. As used herein, a "detection zone" may refer to any suitable physical space, area, and/or range associated with a primary access device. For example, FIG. 2 illustrates an exemplary detection zone 202 associated with a primary access device 204, which may be communicatively coupled to a display screen 206 (e.g., a television) and a detection device 208 that implements detection facility 102. Detection zone 202 may include any suitable area associated with primary access device 204. To illustrate, detection zone 202 may include at least a portion of a room (e.g., a living room) within a user's home where primary access device 204, display screen 206, and/or detection device 208 are located.

Detection device 206 may include any suitable detection device configured to detect a presence of one or more secondary access devices within detection zone 202. For example, detection device 208 may include an image sensor device, a depth sensor device, and/or an audio sensor device configured to detect whether a secondary access device is located within a predetermined distance of primary access device 204, display device 206, and/or detection device 208. In some examples, detection device 208 may alternatively be integrated with primary access device 204.

To illustrate, FIG. 2 shows two secondary access devices 210 (e.g., secondary access device 210-1 and secondary access device 210-2) that may be associated with different users. Detection device 208 may detect that both secondary access devices 210 are located within detection zone 202 (e.g., by detecting that secondary access devices are both located within a predetermined distance of detection device 208) and thereby determine that the users associated with secondary access devices 210 are also located within detection zone 202. Advertisement content may then be presented to the users by way of secondary access devices 210, as will be described in more detail below.

A detection zone may additionally or alternatively refer to a footprint of a local area network (e.g., a range of a wireless router that is a part of a wireless local area network). Hence, detection facility 102 may determine that a secondary access device is located within a detection zone associated with the primary access device by detecting that the secondary access device is connected (by way of either a wired or wireless connection) to a local area network of which the primary access device is a part.

Figure 3:
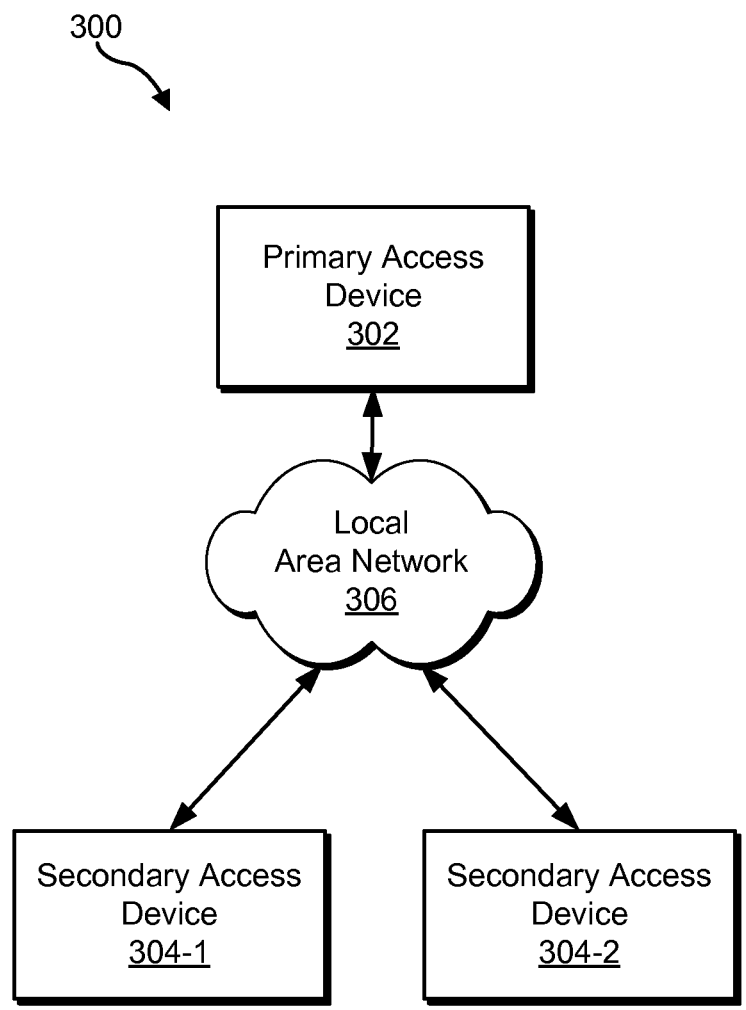
FIG. 3 shows an exemplary configuration wherein a primary access device and two secondary access devices are each connected to a local area network according to principles described herein.

To illustrate, FIG. 3 shows an exemplary configuration 300 wherein a primary access device 302 and two secondary access devices 304 (e.g., secondary access devices 304-1 and 304-2) are each connected to a local area network 306. Local area network 306 may include a home Wi-Fi network, for example, and may be configured to facilitate communication between primary access device 302 and secondary access devices 304. In some examples, detection facility 102 may detect that secondary access devices 304 are connected to local area network 306 and thereby determine that secondary access devices 304 are within a detection zone associated with primary access device 302.

Returning to FIG. 1, advertising facility 104 may be configured to manage (e.g., select, distribute, etc.) advertisement content related to a media content instance presented by way of a primary access device. For example, advertising facility 104 may be configured to select advertisement content related to the media content instance and configured to target one or more users of one or more secondary access devices located within a detection zone of the primary access device. As will be described below, presentation facility 106 may present the advertisement content to the one or more users by way of the one or more secondary access devices.

Various advertisement content selection heuristics (i.e., manners in which advertising facility 104 may select advertisement content) will now be described. It will be recognized that advertising facility 104 may additionally or alternatively select advertisement content in any other suitable way not described specifically herein.

In some examples, advertising facility 104 may select advertisement content to be presented to a user of a secondary access device in accordance with a user profile associated with the user. For example, a user profile associated with a user may include data representative of one or more of the user's traits (e.g., one or more demographic attributes of the user), preferences (e.g., genre preferences, product preferences, etc.), tendencies (e.g., viewing habits), and/or any other type of information associated with the user. Using this information, advertising facility 104 may select advertisement content configured to target the user.

For example, a user profile associated with a first user watching an advertisement for a particular type of energy drink by way of a primary access device may indicate that the first user is male, twenty-one years old, and often watches NASCAR racing. However, a user profile associated with a second user watching the advertisement with the first user may indicate that the second user is female, forty-five years old, and likes to run. Because the user profiles of the two users are different one from another, advertising facility 104 may select different advertisement content instances for presentation by way of each user's secondary access device during the presentation of the advertisement for the energy drink by way of the primary access device. To illustrate, advertising facility 104 may select an advertisement content instance that includes a NASCAR driver promoting the energy drink for presentation to the first user by way of the first user's secondary access device and an advertisement content instance that promotes use of the energy drink for runners for presentation to the second user by way of the second user's secondary access device.

In some examples in which multiple users are watching or otherwise experiencing a media content instance together as a group, advertising facility 104 may select advertisement content to be presented to a particular user in the group in accordance with the collective user profiles of all of the users in the group. In this manner, the presence of one or more friends, family members, etc. of a user may affect the type of advertisement content that is presented to the user. For example, the user profiles associated with a group of users watching a particular media content instance together may indicate that the group of users includes only teenage girls. Hence, advertising facility 104 may select a particular advertisement content instance (e.g., an interactive game) for presentation to a particular girl included in the group that promotes interaction and/or activity by the group of girls as a whole.

In some examples, advertising facility 104 may be configured to select the advertisement content that is to be presented to a user in accordance with a course correction heuristic. As mentioned, a "course correction heuristic" may include any heuristic or technique that refines, adjusts, or otherwise improves the manner in which advertisement content is selected for a particular user over the course of time.

To illustrate, advertising facility 104 may select advertisement content to be presented to a user of a secondary access device in accordance with a course correction heuristic by analyzing an operation history descriptive of one or more operations performed by the secondary access device prior to the presentation of the media content instance and selecting the advertisement content based on the operation history. For example, in some cases, user profile information associated with a user of a particular secondary access device may be unavailable to advertising facility 104. To ascertain one or more traits, preferences, and/or tendencies of the user using the secondary access device, advertising facility 104 may analyze an operation history of the secondary access device. For example, advertising facility 104 may analyze a web browsing history by way of the secondary access device, an application interaction history by way of the secondary access device, and/or any other type of operation performed by way of the secondary access device in order to predict application features in which what the user of the secondary access device may be interested. Using this information, advertising facility 104 may select advertisement content that is potentially of interest to the user for presentation to the user by way of the secondary access device.

Additionally or alternatively, advertising facility 104 may select advertisement content to be presented to a user of a secondary access device in accordance with a course correction heuristic by detecting and/or analyzing one or more ambient actions performed by one or more users located within the detection zone associated with the primary access device and selecting the advertisement content based on the detected ambient action(s). As used herein, the term "ambient action" may refer to any action performed by a user that is independent of and/or not directed at the primary access device. For example, an ambient action may include any action performed by a user during a presentation of a media content instance by way of the primary access device, whether the user is actively experiencing (e.g., actively viewing) or passively experiencing (e.g., passively viewing and/or listening while the user is doing something else) the media content instance.

To illustrate, an exemplary ambient action may include a user eating, exercising, laughing, reading, sleeping, talking, singing, humming, cleaning, playing a musical instrument, performing any other suitable action, and/or engaging in any other physical activity during the presentation of the media content. In certain examples, the ambient action may include an interaction by a user with another user (e.g., another user physically located in the same room as the user). For example, the ambient action may include a user talking to, cuddling with, fighting with, wrestling with, playing a game with, competing with, and/or otherwise interacting with the other user. In further examples, the ambient action may include the user interacting with a secondary access device. For example, the ambient action may include the user interacting with a mobile device (e.g., a mobile phone device, a tablet computer, a laptop computer, etc.) during the presentation of a media content instance by a set-top box device.

Advertising facility 104 (and/or detection facility 102) may be configured to detect an ambient action in any suitable manner. In certain examples, advertising facility 104 may utilize, implement, and/or be implemented by a detection device configured to detect one or more attributes of an ambient action, a user, and/or a user's surroundings. An exemplary detection device may include one or more sensor devices, such as an image sensor device (e.g., a camera device, such as a red green blue ("RGB") camera or any other suitable camera device), a depth sensor device (e.g., an infrared laser projector combined with a complementary metal-oxide semiconductor ("CMOS") sensor or any other suitable depth sensor and/or 3D imaging device), an audio sensor device (e.g., a microphone device such as a multi-array microphone or any other suitable microphone device), a thermal sensor device (e.g., a thermographic camera device or any other suitable thermal sensor device), and/or any other suitable sensor device or combination of sensor devices, as may serve a particular implementation.

Advertising facility 104 may be configured to analyze data received by way of a detection device in order to identify an ambient action performed by one or more users and/or any other type of attribute of the one or more users. For example, advertising facility 104 may analyze the received data utilizing one or more motion capture technologies, motion analysis technologies, gesture recognition technologies, facial recognition technologies, voice recognition technologies, acoustic source localization technologies, and/or any other suitable technologies to detect one or more actions (e.g., movements, motions, gestures, mannerisms, etc.) of the user, a location of the user, a proximity of the user to another user, one or more physical attributes (e.g., size, build, hair length, facial features, and/or any other suitable physical attributes) of the user, one or more voice attributes (e.g., tone, pitch, inflection, language, accent, amplification, and/or any other suitable voice attributes) associated with the user's voice, one or more physical surroundings of the user (e.g., one or more inanimate physical objects proximate to and/or held by the user), and/or any other suitable information associated with the user.

Advertising facility 104 may select advertisement content based on a detected ambient action in any suitable manner. To illustrate, advertising facility 104 may detect that a user is singing or humming a song. Using any suitable signal processing heuristic, advertising facility 104 may identify a name, genre, and/or type of the song. Based on this information, advertising facility 104 may determine that the user is in a particular mood. For example, the user may be singing or humming a generally "happy" song. In response, advertising facility 104 may determine that the user is in a cheerful mood. Accordingly, advertising facility 104 may select advertisement content configured to target happy people for presentation to the user.

In another example, advertising facility 104 may determine that a user is holding and/or interacting with a mobile device. For example, advertising facility 104 may determine that the user is sitting on a couch and interacting with a tablet computer during the presentation of a television program by way of a primary access device. In some examples, advertising facility 104 may be configured to communicate with the mobile device in order to receive data indicating what the user is doing with the mobile device (e.g., data indicating that the user is utilizing the mobile device to browse the web, draft an email, review a document, read an e-book, etc.) and/or representative of content that the user is interacting with (e.g., representative of one or more web pages browsed by the user, an email drafted by the user, a document reviewed by the user, an e-book read by the user, etc.). Based on this information, an appropriate advertisement content instance may be selected for presentation to the user by way of the mobile device.

Additionally or alternatively, advertising facility 104 may select advertisement content to be presented to a user of a secondary access device in accordance with a course correction heuristic by detecting a presence of an inanimate physical object within a detection zone associated with the primary access device and selecting the advertisement content based on the detected physical object. For example, advertising facility 104 may utilize a detection device, such as that described above, to detect and/or identify an animal (e.g., a dog, cat, bird, etc.), a retail product (e.g., a soft drink can, a bag of chips, etc.), furniture (e.g., a couch, a chair, etc.), a decoration (e.g., a painting, a photograph, etc.), and/or any other physical object located within the detection zone. Based on the detected object, advertising facility 104 may select advertisement content for presentation to one or more users by way of one or more secondary access devices.

To illustrate, advertising facility 104 may detect that a piano is located within a detection zone associated with a primary access device. Based on this information, advertising facility 104 may deduce that a user located in the detection zone may play the piano. Accordingly, advertising facility 104 may select an advertisement content instance related to pianos and/or music for presentation to the user.

Additionally or alternatively, advertising facility 104 may select advertisement content to be presented to a user of a secondary access device in accordance with a course correction heuristic by detecting a sharing of a particular advertisement content instance with the user by another user prior to the presentation of the media content instance by way of the primary access device and selecting the advertisement content based on the shared advertisement content instance.

To illustrate, a friend of the user may know that the user likes first-person shooter video games. When the friend sees an advertisement content instance for a first-person shooter video game, the friend may share (e.g., forward, send a link to, etc.) the advertisement content instance to the user for experiencing by the user. Advertising facility 104 may detect this sharing and thereby deduce that the user is likely interested in first-person shooter video games. Advertising facility 104 may then select advertisement content for presentation to the user that is geared towards people who like first-person shooter video games.

Additionally or alternatively, advertising facility 104 may select advertisement content to be presented to a user of a secondary access device in accordance with a course correction heuristic by detecting an interaction of the user with one or more advertisement content instances presented to the user prior to the presentation of the media content instance by way of the primary access device and selecting the advertisement content based on the detected interaction.

To illustrate, advertising facility 104 may detect that a user interacts with (e.g., views, shares, saves, etc.) a particular advertisement content instance that promotes a particular movie. Based on this interaction, advertising facility 104 may determine that the user is interested in the movie and/or in movies of similar genre or type. Subsequently, advertising facility 104 may select an advertisement content instance that promotes another movie of similar genre for presentation to the user.

As another example, a user may "unlock" (i.e., gain access to) content after watching or otherwise interacting with a particular advertisement content instance. For example, a user may gain access to a coupon for a store after watching an advertisement for the store. Advertising facility 104 may track which content has been unlocked by a particular user over time and utilize this information to select advertisement content that better targets the user. Moreover, such tracking may allow a service provider associated with advertising facility 104 to more effectively charge vendors for advertisements presented to particular users. For example, advertising facility 104 may determine that a particular user has interacted with a relatively large number of advertisements and accordingly increase the cost to a vendor for providing advertisements to the user.

In cases where the media content instance being presented by way of the primary access device is an advertisement, advertising facility 104 may select advertisement content to be presented to a user of a secondary access device in accordance with a course correction heuristic by detecting an interaction of the user with the advertisement and/or a media content program presented in conjunction with the advertisement and selecting the advertisement content based on the detected interaction. Exemplary interactions by the user that may be detected include the user adjusting a volume level, switching to a different channel, pausing or resuming the presentation of the media content program and/or advertisement, etc.

To illustrate, advertising facility 104 may detect that a user has increased a volume level associated with a presentation of a media content program (e.g., a television program) while viewing the media content program. This may indicate that the user is actively viewing the media content program and relatively likely to pay attention to an advertisement content instance related to the media content program that is presented by way of the user's secondary access device. Hence, advertising facility 104 may select a particular advertisement content instance geared towards people actively paying attention to the media content program (e.g., an advertisement featuring a character in the media content program) for presentation to the user by way of the user's secondary access device.

In some examples, advertising facility 104 may be further configured to select an advertisement that is to be presented by way of the primary access device to a group of users. For example, detection facility 102 may detect a presence of a group of users within a detection zone of the primary access device (e.g., by using one or more facial recognition heuristics, analyzing predefined relationships of the users with secondary access devices located within the detection zone, etc.). Advertising facility 104 may then select an advertisement configured to target the group of users as a whole for presentation to the group of users by way of the primary access device. The selection may be performed in any of the manners described herein.

As mentioned, presentation facility 106 may be configured to present advertisement content to one or more users by way of one or more secondary access devices. For example, presentation facility 106 may direct a secondary access device to display the advertisement content on a display screen associated with the secondary access device during the presentation of a related media content instance by way of a primary access device. It will be recognized that in some implementations the advertisement content may remain accessible by way of the secondary access device after the presentation of the media content instance by way of the primary access device. In this manner, the user may interact with and/or otherwise access the advertisement content at a time and in a manner of the user's choosing.

Storage facility 108 may be configured to maintain media content data 110 representative of one or more media content instances, detection data 112 representative of data and/or information detected/obtained by detection facility 102, user profile data 114 representative of user profile information associated with one or more users, and advertisement content data 116 representative of one or more advertisement content instances. Storage facility 108 may be configured to maintain additional or alternative data as may serve a particular implementation.

Figure 4:
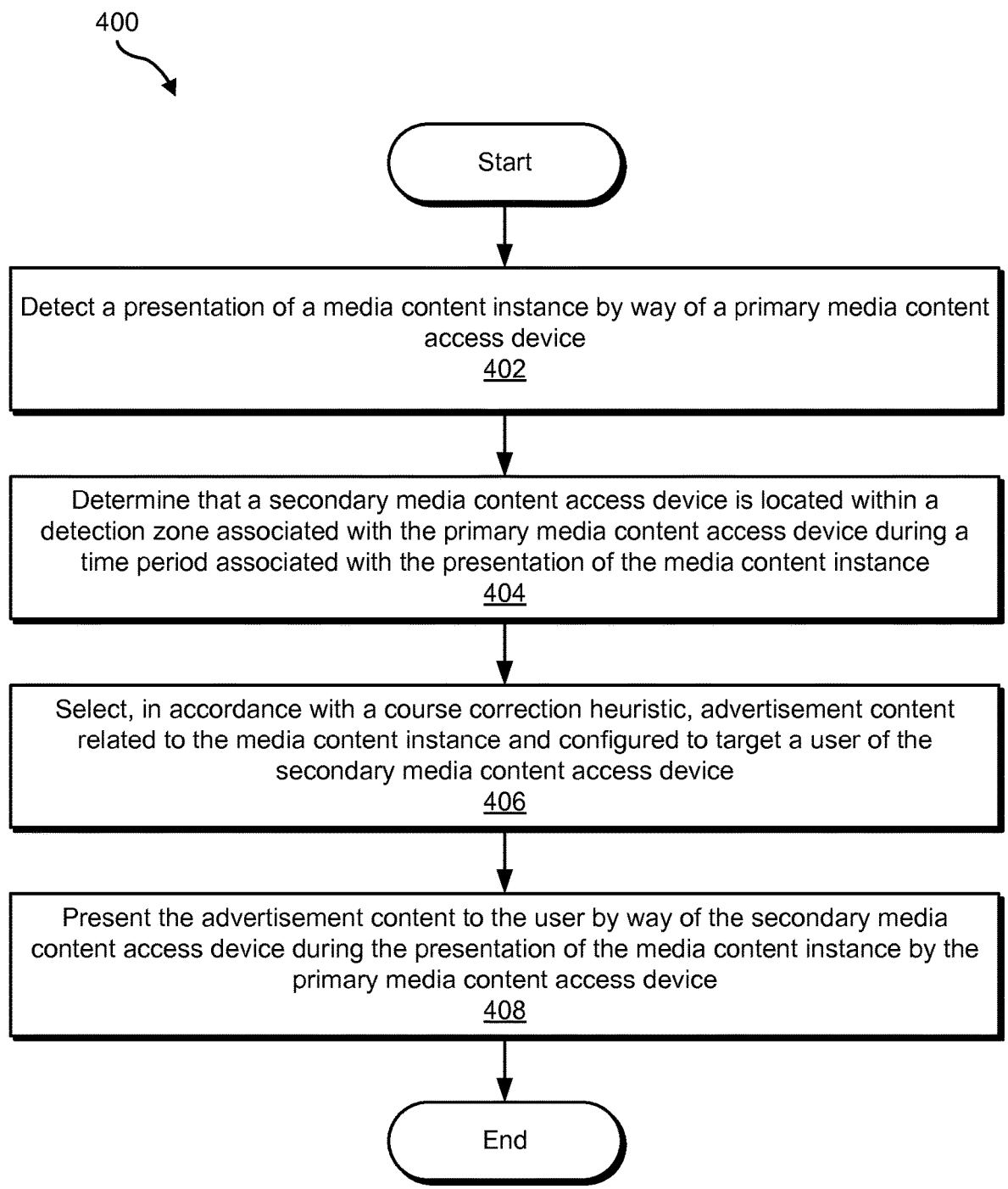
FIG. 4 illustrates an exemplary targeted advertisement content presentation method according to principles described herein.

FIG. 4 illustrates an exemplary targeted advertisement content presentation method 400 according to principles described herein. While FIG. 4 illustrates exemplary steps according to one embodiment, other embodiments may omit, add to, reorder, and/or modify any of the steps shown in FIG. 4. One or more of the steps shown in FIG. 4 may be performed by any component or combination of components of system 100.

In step 402, a media content presentation system detects a presentation of a media content instance by way of a primary media content access device. Step 402 may be performed in any of the ways described herein.

In step 404, the media content presentation system determines that a secondary media content access device is located within a detection zone associated with the primary media content access device during a time period associated with the presentation of the media content instance. Step 404 may be performed in any of the ways described herein.

In step 406, the media content presentation system selects, in accordance with a course correction heuristic, advertisement content related to the media content instance and configured to target a user of the secondary media content access device. Step 406 may be performed in any of the ways described herein.

In step 408, the media content presentation system presents the advertisement content to the user by way of the secondary media content access device during the presentation of the media content instance by the primary media content access device. Step 408 may be performed in any of the ways described herein.

Figure 5:
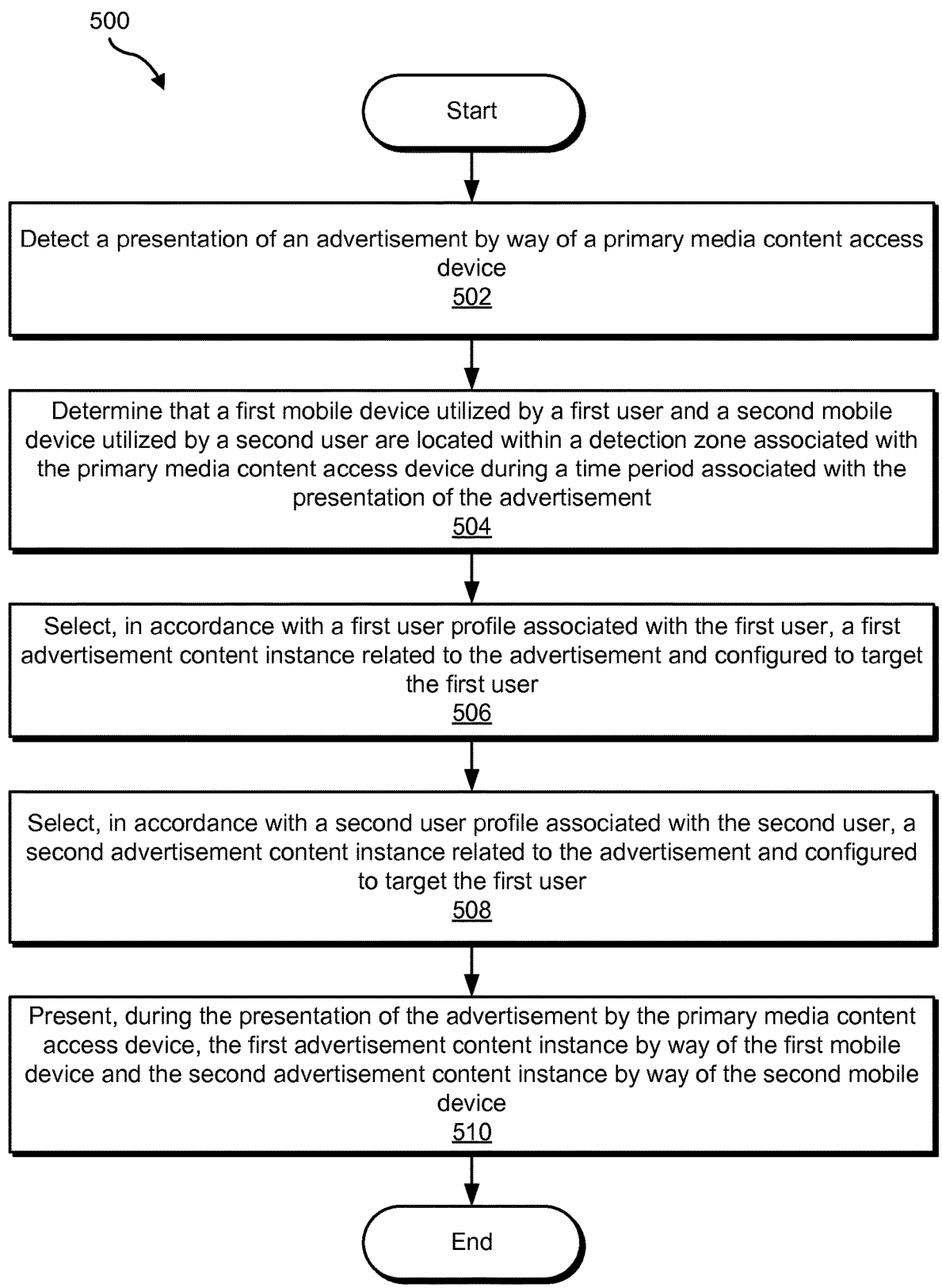
FIG. 5 illustrates another exemplary targeted advertisement content presentation method according to principles described herein.

FIG. 5 illustrates another exemplary targeted advertisement content presentation method 500 according to principles described herein. While FIG. 5 illustrates exemplary steps according to one embodiment, other embodiments may omit, add to, reorder, and/or modify any of the steps shown in FIG. 5. One or more of the steps shown in FIG. 5 may be performed by any component or combination of components of system 100.

In step 502, a media content presentation system detects a presentation of an advertisement by way of a primary media content access device. Step 502 may be performed in any of the ways described herein.

In step 504, the media content presentation system determines that a first mobile device associated with a first user and a second mobile device associated with a second user are located within a detection zone associated with the primary media content access device during a time period associated with the presentation of the advertisement. Step 504 may be performed in any of the ways described herein.

In step 506, the media content presentation system selects, in accordance with a first user profile associated with the first user, a first advertisement content instance related to the advertisement and configured to target the first user. Step 506 may be performed in any of the ways described herein.

In step 508, the media content presentation system selects, in accordance with a second user profile associated with the second user, a second advertisement content instance related to the advertisement and configured to target the second user. In some examples, the second advertisement content instance is different than the first advertisement content instance. Step 508 may be performed in any of the ways described herein.

In step 510, the media content presentation system presents, during the presentation of the advertisement by the primary media content access device, the first advertisement content instance by way of the first mobile device and the second advertisement content instance by way of the second mobile device. Step 510 may be performed in any of the ways described herein.

Figure 6:
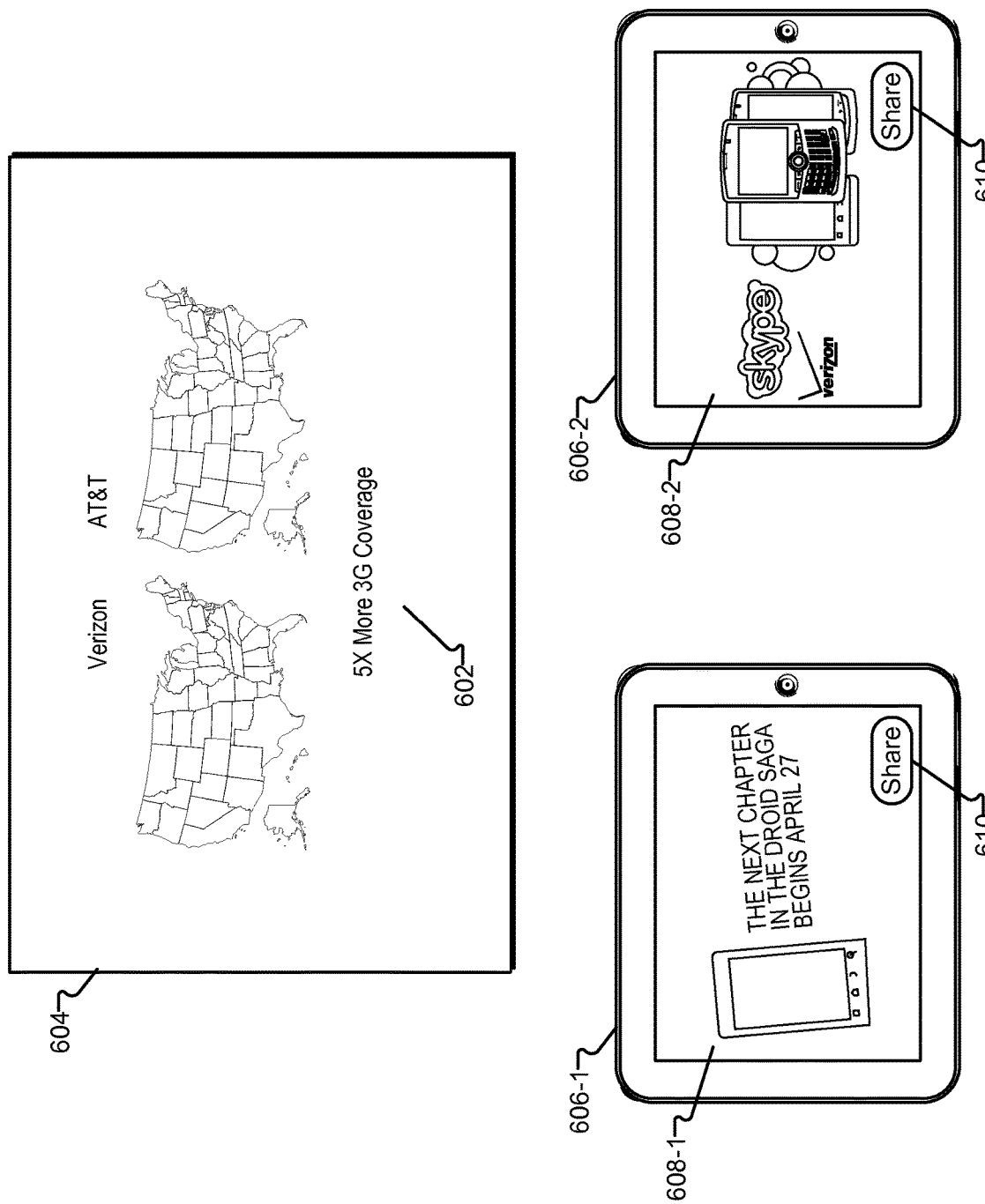
FIG. 6 shows an exemplary implementation of the method of FIG. 5 according to principles described herein.

FIG. 6 shows an exemplary implementation of method 500. As shown, an advertisement 602 for a mobile phone service may be displayed by a display screen 604 associated with a primary access device. During the presentation of advertisement 602, two mobile devices 606 (e.g., mobile device 606-1 and mobile device 606-2) may be located within a detection zone associated with the primary access device. System 100 may determine in any of the ways described herein that the user of mobile device 606-1 is interested in technology and gadgets. Hence, an advertisement content instance 608-1 promoting a particular type of mobile phone that may be used with the mobile phone service may be presented by way of mobile device 606-1 during the presentation of advertisement 602 by way of the primary access device. Likewise, system 100 may determine in any of the ways described herein that the user of mobile device 606-2 is interested in calling features associated with the mobile phone service. Hence, an advertisement content instance 608-2 promoting a VOIP calling feature that may be used with the mobile phone service may be presented by way of mobile device 606-2 during the presentation of advertisement 602 by way of the primary access device.

In some examples, either one of the users of mobile phones 606 may desire to share a particular advertisement content instance (e.g., advertisement content instance 608-1 and/or advertisement content instance 608-2) with another user. To this end, a share option 610 may be selected by the user. Selection of share option 610 may cause an interface to be presented by which the user may select a contact or otherwise input a destination address (e.g., an email address and/or a telephone number) for a recipient with whom the user would like to share the advertisement content instance. System 100 may then provide the recipient with access to the advertisement content instance.

Figure 7:
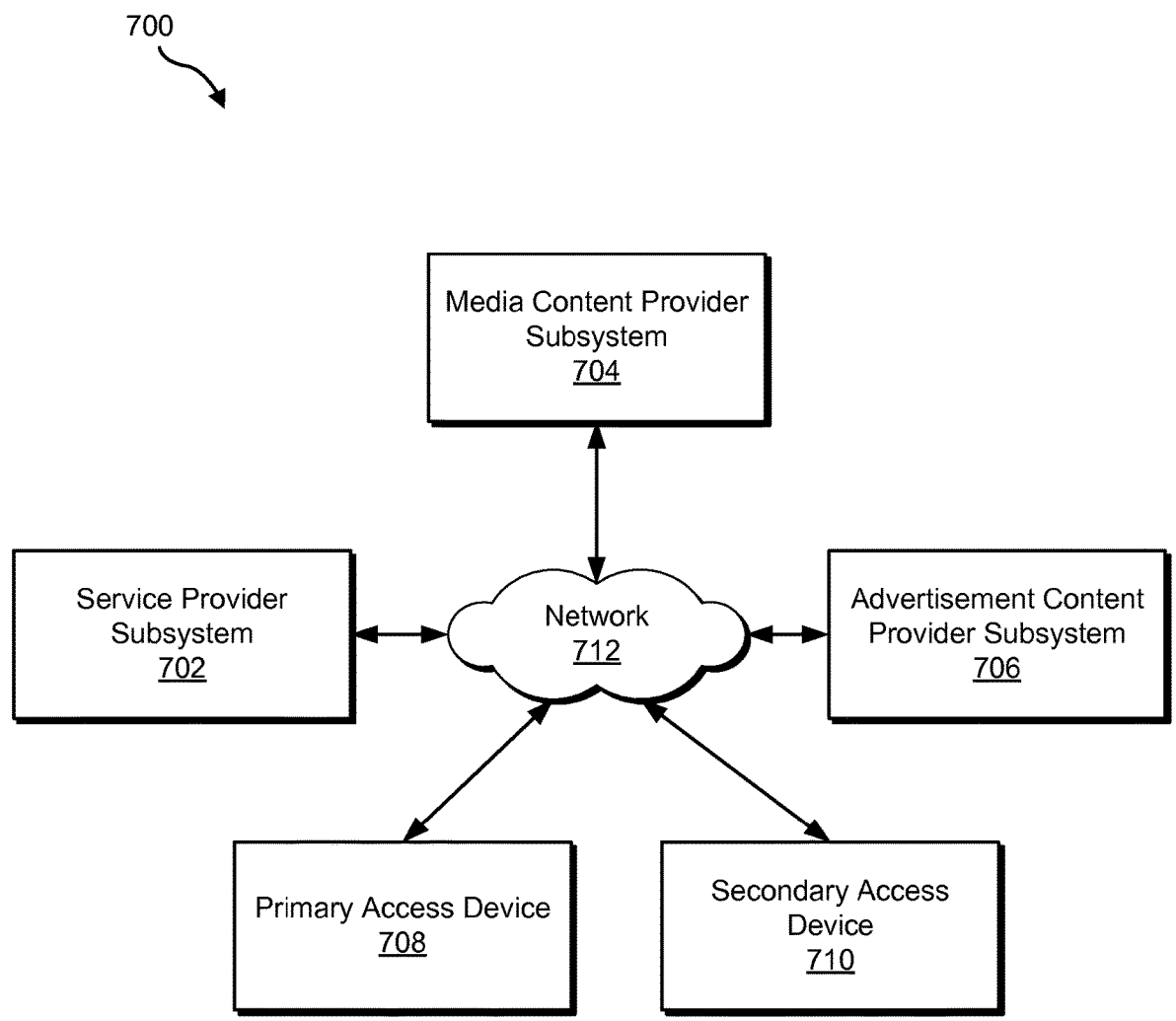
FIG. 7 illustrates an exemplary implementation of the system of FIG. 1 according to principles described herein.

FIG. 7 illustrates an exemplary implementation 700 of system 100 wherein a service provider subsystem 702, a media content provider subsystem 704, and an advertisement content provider subsystem 706 are communicatively coupled to a primary access device 708 and a secondary access device 710 by way of a network 712. As will be described in more detail below, detection facility 102, targeted advertising facility 104, presentation facility 106, and storage facility 108 may each be implemented by one or more of service provider subsystem 702, media content provider subsystem 704, advertisement content provider subsystem 706, primary access device 708, and secondary access device 710.

Service provider subsystem 702 may be associated with a service provider (e.g., a subscriber television service provider, an Internet service provider, etc.) and may be configured to provide one or more content services (e.g., television services, video-on-demand services, Internet services, etc.) to primary access device 708 and/or secondary access device 710. For example, service provider subsystem 702 may be configured to manage (e.g., maintain, process, distribute, and/or generate) media content (e.g., media content programs, advertisements, etc.) configured to be presented to one or more users of primary access device 708.

Media content provider subsystem 704 may be associated with any suitable media content provider (e.g., ESPN, etc.) and may be configured to provide media content for presentation to one or more users of primary access device 708. In some examples, the media content may be provided to primary access device 708 by way of service provider subsystem 702.

Advertisement content provider subsystem 706 may be configured to provide advertisement content for presentation by way of primary access device 708 and/or secondary access device 710. For example, advertisement content provider subsystem 706 may be configured to provide targeted advertisement content for presentation by way of secondary access device 710. In some alternative examples, advertisement content provider subsystem 706 may be included within service provider subsystem 702 and/or managed by the same service provider that controls service provider subsystem 702.

Primary access device 708 may be configured to facilitate access by a user to content (e.g., media content programs and/or advertisement content) provided by any of subsystems 702-206 and/or content stored locally by primary access device 708. Primary access device 708 may be implemented by any suitable access device, such as a set-top box device, a digital video recorder ("DVR") device, a personal computer, a mobile device (e.g., a mobile phone or a tablet computer), a personal-digital assistant device, a gaming device, a television device, and/or any other suitable computing device configured to access content.

Secondary access device 710 may be configured to facilitate access by a user to advertisement content related to one or more media content instances presented by way of primary access device 708. Secondary access device 710 may be implemented by any suitable access device, such as a set-top box device, a DVR device, a personal computer, a mobile device (e.g., a mobile phone or a tablet computer), a personal-digital assistant device, a gaming device, a television device, and/or any other suitable computing device configured to access advertisement content.

Service provider subsystem 702, media content provider subsystem 704, advertisement content provider subsystem 706, primary access device 708, and/or secondary access device 710 may each be implemented by one or more computing devices. For example, service provider subsystem 702, media content provider subsystem 704, advertisement content provider subsystem 706, primary access device 708, and/or secondary access device 710 may be implemented by one or more server devices, access devices, and/or other computing devices.

Service provider subsystem 702, media content provider subsystem 704, advertisement content provider subsystem 706, primary access device 708, and/or secondary access device 710 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Service provider subsystem 702, media content provider subsystem 704, advertisement content provider subsystem 706, primary access device 708, and/or secondary access device 710 may communicate using any suitable network. For example, as shown in FIG. 7, service provider subsystem 702, media content provider subsystem 704, advertisement content provider subsystem 706, primary access device 708, and/or secondary access device 710 may be configured to communicate with each other by way of network 712. Network 712 may include one or more networks or types of networks capable of carrying communications and/or data signals between the components of system 100. For example, network 712 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

In certain embodiments, system 100 may be implemented entirely by or within service provider subsystem 702, media content provider subsystem 704, advertisement content provider subsystem 706, primary access device 708, or secondary access device 710. For example, system 100 may be implemented entirely by service provider subsystem 702, by media content provider subsystem 704, by advertisement content provider subsystem 706, by primary access device 708, or by secondary access device 710. In other embodiments, components of system 100 may be distributed across service provider subsystem 702, media content provider subsystem 704, advertisement content provider subsystem 706, primary access device 708, and/or secondary access device 710.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 8:
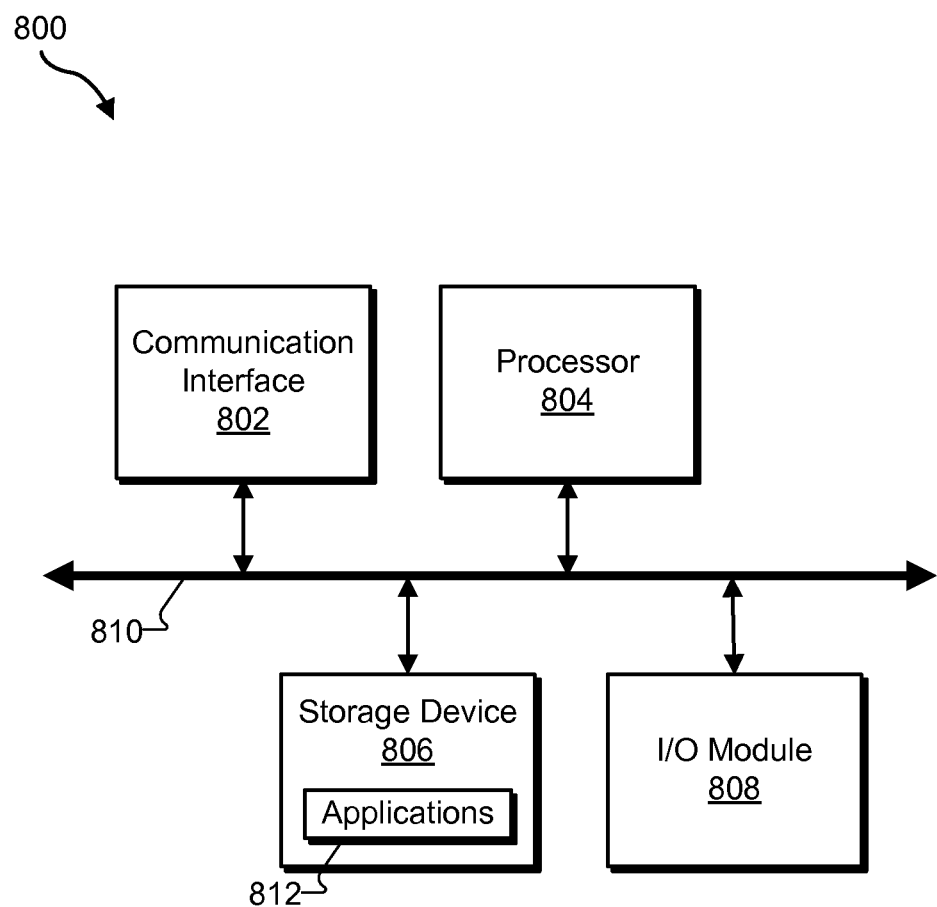
FIG. 8 illustrates an exemplary computing device according to principles described herein.

FIG. 8 illustrates an exemplary computing device 800 that may be configured to perform one or more of the processes described herein. As shown in FIG. 8, computing device 800 may include a communication interface 802, a processor 804, a storage device 806, and an input/output ("I/O") module 808 communicatively connected via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 806. For example, data representative of one or more executable applications 812 (which may include, but are not limited to, one or more of the software applications described herein) configured to direct processor 804 to perform any of the operations described herein may be stored within storage device 806. In some examples, data may be arranged in one or more databases residing within storage device 806.

I/O module 808 may be configured to receive user input and provide user output and may include any hardware, firmware, software, or combination thereof supportive of input and output capabilities. For example, I/O module 808 may include hardware and/or software for capturing user input, including, but not limited to, a keyboard or keypad, a touch screen component (e.g., touch screen display), a receiver (e.g., an RF or infrared receiver), and/or one or more input buttons.

I/O module 808 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with detection facility 102, advertising facility 104, and/or presentation facility 106. Likewise, storage facility 108 may be implemented by or within storage device 806.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
receiving, by a primary media content access device from a media content provider subsystem by way of a subscriber television network, a media content stream comprising data representative of a media content instance, the primary media content access device comprising a set top box;
presenting, by the primary media content access device by way of a display screen communicatively connected with the primary media content access device by way of a local area network, the media content instance;
detecting, by the primary media content access device during the presentation of the media content instance, a presentation of a media content instance;
determining, by the primary media content access device in response to the detecting of the presentation of the media content instance, that a secondary media content access device and a user of the secondary media content access device are located within a detection zone associated with the primary media content access device during a time period associated with the presentation of the media content instance, the determining that the secondary media content access device and the user are located within the detection zone comprising:
detecting, by way of a detection device included in the primary media content access device, physical surroundings of the detection zone detected by the detection device during the time period associated with the presentation of the media content instance to obtain data representative of the physical surroundings of the detection zone, the detection device included in the primary media content access device comprising at least one of an image sensor device, a depth sensor device, an audio sensor device, and a thermal sensor device;
identifying, based on the data representative of the physical surroundings of the detection zone, a location of the secondary media content access device;
determining, based on the data representative of the physical surroundings of the detection zone, that the secondary media content access device is located within a first predetermined distance of the primary media content access device or the display screen; and
determining, based on the data representative of the physical surroundings of the detection zone, that the user is located within a second predetermined distance of the secondary media content access device; and
in response to the determining that the secondary media content access device and the user of the secondary media content access device are located within the detection zone during the time period associated with the presentation of the media content instance, performing:
selecting, by the primary media content access device in accordance with a course correction heuristic, advertisement content related to the media content instance and configured to target the user of the secondary media content access device, the selecting of the advertisement content in accordance with the course correction heuristic comprising
detecting a sharing of a particular advertisement content instance with the user by another user prior to the presentation of the media content instance and
selecting the advertisement content based on the shared advertisement content instance; and
directing, by the primary media content access device, the secondary media content access device to present the selected advertisement content during the presentation of the media content instance by the primary media content access device,
wherein
the media content instance presented by way of the primary media content access device comprises a first version of an advertisement,
the advertisement content presented by way of the secondary media content access device comprises a second version of the advertisement, and
the first version of the advertisement presented by way of the primary media content access device is different than the second version of the advertisement presented by way of the secondary media content access device.

2. The method of claim 1, further comprising:
determining, by the primary media content access device in response to the detecting of the presentation of the media content instance, that an additional secondary media content access device and an additional user of the additional secondary media content access device are located within the detection zone during the time period associated with the presentation of the media content instance, the determining that the additional secondary media content access device and the additional user are located within the detection zone comprising:
identifying, based on the data representative of the physical surroundings of the detection zone, a location of the additional secondary media content access device;
determining, based on the data representative of the physical surroundings of the detection zone, that the additional secondary media content access device is located within the first predetermined distance of the primary media content access device or the display screen; and determining, based on the data representative of the physical surroundings of the detection zone, that the additional user is located within the second predetermined distance of the additional secondary media content access device; and in response to the determining that the additional secondary media content access device and the additional user of the additional secondary media content access device are located within the detection zone during the time period associated with the presentation of the media content instance, performing:

selecting, by the primary media content access device in accordance with the course correction heuristic, additional advertisement content related to the media content instance and configured to target the additional user of the additional secondary media content access device; and directing, by the primary media content access device, the additional secondary media content access device to present the selected additional advertisement content during the presentation of the media content instance by the primary media content access device, wherein the additional advertisement content presented by way of the additional secondary media content access device comprises a third version of the advertisement.

3. The method of claim 2, wherein the second version of the advertisement presented by way of the secondary media content access device is different than the third version of the advertisement content presented by way of the additional secondary media content access device, and the third version of the advertisement presented by way of the additional secondary media content access device is different than the first version of the advertisement presented by way of the primary media content access device.

4. The method of claim 1, wherein the selecting of the advertisement content configured to target the user of the secondary media content access device is further performed in accordance with a user profile associated with the user.

5. The method of claim 4, wherein the selecting of the advertisement content configured to target the user of the secondary media content access device is further performed in accordance with one or more additional user profiles associated with one or more additional users located within the detection zone.

6. The method of claim 1, wherein the selecting of the advertisement content in accordance with the course correction heuristic further comprises:

analyzing an operation history descriptive of one or more operations performed by the secondary media content access device prior to the presentation of the media content instance; and selecting the advertisement content based on the operation history.

7. The method of claim 1, wherein the selecting of the advertisement content in accordance with the course correction heuristic further comprises:

detecting, by way of the detection device, an ambient action performed by at least one of the user and one or more other users within the detection zone; and selecting the advertisement content based on the detected ambient action.

8. The method of claim 1, wherein the selecting of the advertisement content in accordance with the course correction heuristic further comprises:

detecting, by way of the detection device, a presence of an inanimate physical object within the detection zone; and selecting the advertisement content based on the detected inanimate physical object.

9. The method of claim 1, wherein the selecting of the advertisement content in accordance with the course correction heuristic further comprises:

detecting an interaction of the user with one or more advertisement content instances presented to the user prior to the presentation of the media content instance by way of the primary media content access device; and selecting the advertisement content based on the detected interaction.

10. The method of claim 1, wherein the selecting of the advertisement content in accordance with the course correction heuristic further comprises:

detecting an interaction by the user with at least one of the first version of the advertisement presented by way of the primary media content access device and a media content program presented in conjunction with the first version of the advertisement presented by way of the primary media content access device; and selecting the advertisement content based on the detected interaction.

11. The method of claim 1, further comprising:

detecting, by the primary media content access device by way of the detection device, a presence of a group of users within the detection zone of the primary media content access device, the group of users including the user; and selecting, by the primary media content access device, a particular advertisement configured to target the group of users as a whole as the first version of the advertisement that is presented by way of the primary media content access device.

12. The method of claim 1, wherein the advertisement content presented by way of the secondary media content access device comprises at least one of an interactive advertisement and a coupon.

13. The method of claim 1, wherein the time period associated with the presentation of the media content instance comprises at least one of a time period immediately prior to the presentation of the media content instance and a time period during the presentation of the media content instance.

14. The method of claim 1, wherein the data representative of the physical surroundings of the detection zone comprises data representative of one or more attributes of the user of the secondary media content access device.

15. A system comprising:

a set top box including a processor that:

receives, from a media content provider subsystem by way of a subscriber television network, a media content stream comprising data representative of a media content instance;

presents, by way of a display screen communicatively connected with the set top box by way of a local area network, the media content instance;

detects a presentation of a first version of an advertisement by analyzing the media content stream received by the set top box, and detecting an advertisement break included in the media content stream, determines, in response to a detection of the presentation of the first version of the advertisement, that a secondary media content access device and a user of the secondary media content access device are located within a detection zone associated with the set top box during a time period associated with the presentation of the first version of the advertisement by:
- detecting, by way of a detection device included in the set top box, physical surroundings of the detection zone detected by the detection device during the time period associated with the presentation of the first version of the advertisement to obtain data representative of the physical surroundings of the detection zone, the detection device included in the set top box comprising at least one of an image sensor device, a depth sensor device, an audio sensor device, and a thermal sensor device;
- identifying, based on the data representative of the physical surroundings of the detection zone, a location of the secondary media content access device;
- determining, based on the data representative of the physical surroundings of the detection zone, that the secondary media content access device is located within a first predetermined distance of the set top box or the display screen; and
- determining, based on the data representative of the physical surroundings of the detection zone, that the user is located within a second predetermined distance of the secondary media content access device; and in response to the determining that the secondary media content access device and the user of the secondary media content access device are located within the detection zone during the time period associated with the presentation of the first version of the advertisement, performs:
- selecting, in accordance with a course correction heuristic, a second version of the advertisement configured to target the user of the secondary media content access device and different from the first version of the advertisement, the selecting of the advertisement content in accordance with the course correction heuristic comprising detecting a sharing of a particular advertisement content instance with the user of the secondary media content access device by another user prior to the presentation of the media content instance and selecting the advertisement content based on the shared advertisement content instance; and
- directing the secondary media content access device to present the second version of the advertisement during the presentation of the first version of the advertisement by the set top box.

* * * * *